(No Model.)

S. G. DERHAM.
PRESSURE FILTER.

No. 337,486. Patented Mar. 9, 1886.

WITNESSES:
F. W. Rosenbaum
Martin Petry

INVENTOR
Samuel G. Derham
BY
Goepel Rozgener
ATTORNEYS.

UNITED STATES PATENT OFFICE.

SAMUEL G. DERHAM, OF NEW YORK, ASSIGNOR TO CARL P. LENK, OF BROOKLYN, N. Y.

PRESSURE-FILTER.

SPECIFICATION forming part of Letters Patent No. 337,486, dated March 9, 1886.

Application filed December 18, 1885. Serial No. 186,109. (No model.)

*To all whom it may concern:*

Be it known that I, SAMUEL G. DERHAM, of the city, county, and State of New York, have invented certain new and useful Improvements in Pressure-Filters, of which the following is a specification.

This invention relates to an improved pressure-filter for wine, beer, and other liquids.

Figure 1:
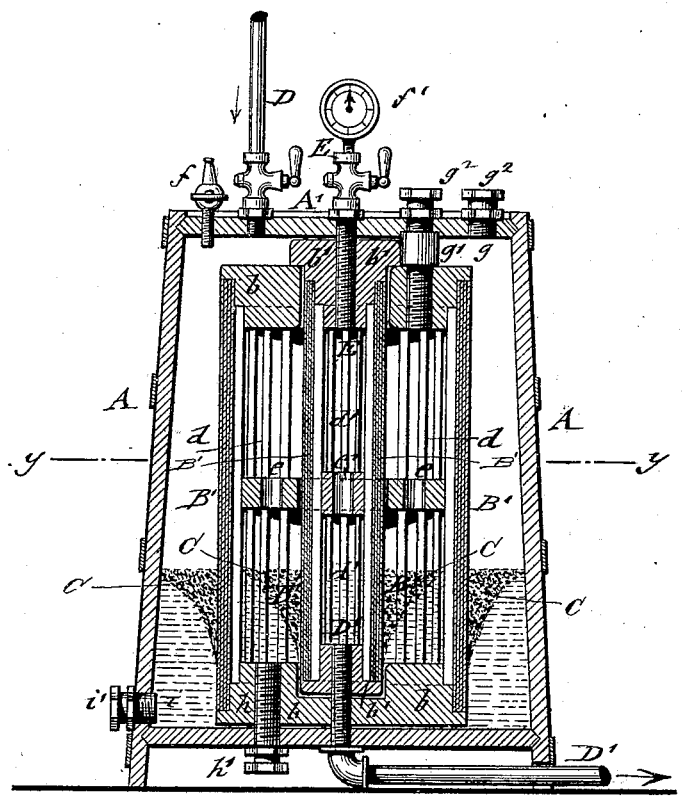
Figure 3:
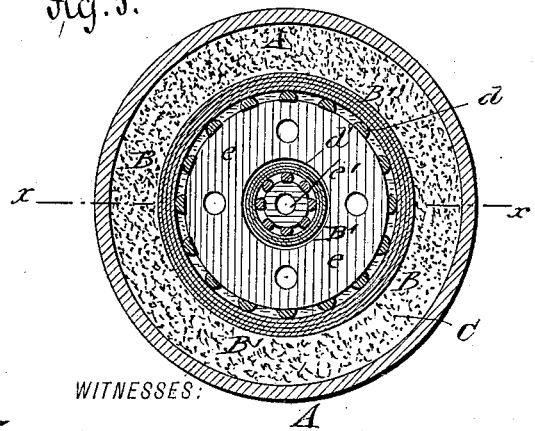
Figure 2:
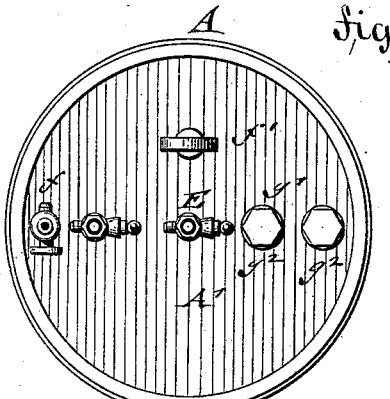

In the accompanying drawings, Figure 1 represents a vertical central section of my improved pressure-filter on line $x\,x$, Fig. 3. Fig. 2 is a plan of the same. Fig. 3 is a horizontal section on line $y\,y$, Fig. 1.

Similar letters of reference indicate corresponding parts.

A in the drawings represents a vessel, of suitable shape and material, which is closed at the bottom and provided with a detachable cover, A', at the top, which cover is tightly secured to the vessel A. At the interior of the vessel A is supported a filtering body, B, which is made in two concentrical sections, each formed of two heads, $b\,b'$, and longitudinal slats $d\,d'$, that are attached to the heads $b\,b'$. The heads $b'$ of the inner section of the filtering body B are fitted in the heads $b$ of the outer section, as shown in Fig. 1, and the slats $d\,d'$ are retained in position by one or more perforated diaphragms $e\,e'$. Each section of the filtering body is covered with a thick layer, B', of suitable filtering material, which is wrapped around the slats $d\,d$ and $d'\,d'$. The outer diaphragm, $e$, is annular in shape and extends from the inner face of the outer slats to the outer face of the filtering material B', which covers the inner slats, while the inner diaphragm, $e'$, is simply a perforated disk fitting tightly within the circular space between the inner slats, $d'$, and standing preferably opposite said outer diaphragm, whereby the slats are securely braced in position and the sections of the filtering body B prevented from collapsing by pressure upon their exterior faces.

The liquid to be filtered is supplied by the pipe D and compelled to pass through the filtering material of the outer section of the body B, and the filtering material of the inner section to the interior of the same and through the discharge-pipe D', passing through the bottom head of the inner section, and of the vessel A to the outside, as shown in Fig. 1.

The cover A' is provided with the usual valved vent, $f$, a pressure-gage, $f'$, and a valved pipe, E, that passes through the head of the inner section of the filtering body B, and serves for supplying the liquid for cleaning the filter. The cover A' is further provided with two short pipes, $g$ and $g'$, that are closed by detachable screw-caps $g^2$, the pipe $g$ communicating with the space between the vessel A and the filtering body B, while the pipe $g'$ passes through the head $b$ of the filtering body and communicates with the space between the outer and inner sections of the same, as shown in Fig. 1.

The pipes $g\,g'$ serve for the purpose of introducing paper-pulp, charcoal, or other loose filtering material, C, into the space between the vessel and the filtering body and the space between the outer and inner sections of the latter, so that said loose filtering material C is pressed by the suction in the form of two layers against the outer surfaces of the filtering material B' of the inner and outer sections of the body B. The loose filtering material C acts as an effective auxillary to the filtering material B' of the body B. The loose filtering material C is introduced into the filter by being mixed with a portion of the liquid to be filtered, which liquid is then drained off by pressure of the liquid supplied through the pipe D.

The bottom head, $b$, of the filtering body B is provided with an outlet-pipe, $h$, having a detachable screw-cap, $h'$, by which the loose filtering material in the space between the inner and outer filtering layers can be drained for being renewed. The loose filtering material in the space around the body B is removed through a pipe, $i$, having a screw-cap, $i'$.

The filter can be readily cleaned by passing water or other washing liquid through the pipe E, and the inner and outer sections of the body B in opposite direction to the direction of motion of the filtered liquid, and to the outside through the pipe $i$ in or close to the bottom of the vessel A, as shown in Fig. 1. A very effective filter is thus formed, which can be conveniently cleaned, readily taken to pieces, and provided from time to time with new filtering material C.

Having thus described my invention, I claim as new and desire to secure by Letters Patent—

1. A filtering body comprising two heads, longitudinal slats connecting said heads, a perforated disk fitting tightly within the space between said slats and a covering-layer of filtering material.

2. A filtering body consisting of two concentric sections, each comprising two heads, longitudinal slats connecting said heads, a covering-layer of filtering material wound around each section, a perforated disk fitting tightly within the space between the slats of the inner section, and an annular perforated diaphragm fitting tightly within the annular space between the slats of the outer and the filtering material upon the slats of the inner sections.

3. A filtering body consisting of two concentric sections each comprising two heads, longitudinal slats connecting said heads, a covering-layer of filtering material wound around each section, a perforated disk fitting tightly within the space between the slats of the inner section, and a perforated diaphragm fitting tightly within the annular space between the slats of the outer and the filtering material upon the slats of the inner sections, said disk and diaphragm standing opposite each other.

In testimony that I claim the foregoing as my invention I have signed my name in presence of two subscribing witnesses.

SAML. G. DERHAM.

Witnesses:
PAUL GOEPEL,
MARTIN PETRY.